(12) United States Patent
Valdez et al.

(10) Patent No.: US 11,310,568 B2
(45) Date of Patent: Apr. 19, 2022

(54) SYSTEMS AND METHODS FOR SECURELY PROVIDING PREVIEW SAMPLES OF MEDIA CONTENT DISTRIBUTED TO IN-FLIGHT ENTERTAINMENT SYSTEMS

(71) Applicant: Panasonic Avionics Corporation, Lake Forest, CA (US)

(72) Inventors: Michael Valdez, Eastvale, CA (US); Ivan Jo, Orange, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 0 days.

(21) Appl. No.: 16/867,456

(22) Filed: May 5, 2020

(65) Prior Publication Data

US 2021/0352383 A1 Nov. 11, 2021

(51) Int. Cl.
*H04N 7/18* (2006.01)
*H04N 21/8549* (2011.01)
*H04N 21/439* (2011.01)
*H04N 21/44* (2011.01)
*H04N 21/214* (2011.01)

(52) U.S. Cl.
CPC ..... *H04N 21/8549* (2013.01); *H04N 21/2146* (2013.01); *H04N 21/439* (2013.01); *H04N 21/44* (2013.01)

(58) Field of Classification Search
CPC .......... H04N 21/8549; H04N 21/2146; H04N 21/44; H04N 21/439
USPC ......................................................... 725/77
See application file for complete search history.

(56) References Cited

U.S. PATENT DOCUMENTS

| | | | |
|---|---|---|---|
| 6,085,222 A * | 7/2000 | Fujino ................... | H04L 41/046 709/202 |
| 8,752,100 B2 * | 6/2014 | Ramakrishnan ... | H04N 21/4788 725/90 |
| 8,756,341 B1 * | 6/2014 | Richardson ............. | H04L 67/42 709/245 |
| 8,762,564 B1 * | 6/2014 | Philpott ............. | H04N 21/8456 709/231 |
| 9,264,508 B2 * | 2/2016 | Wolf ................ | H04N 21/64322 |
| 9,628,840 B2 | 4/2017 | Bleacher et al. | |
| 10,070,331 B2 | 9/2018 | Lin | |
| 2005/0160452 A1 * | 7/2005 | Lawler ................... | H04N 21/47 725/38 |

(Continued)

*Primary Examiner* — Michael B. Pierorazio
(74) *Attorney, Agent, or Firm* — Perkins Coie LLP (57) ABSTRACT

Systems and methods for providing preview samples of media content, such as early window movies, which is secure against unauthorized copying of the media content. The system includes a media receiving server configured to receive secure media content, such as early window movies, from a movie provider. The media receiving server generates a preview sample including a video sample including a series of still digital images from the video file, each separated by a time interval in the video file from the other still digital images in the series of still digital images; and an audio sample including a series of audio clips from the video file, each separated by a time interval in the video file from the other audio clips in the series of audio clips. A customer of the media content can review the sample preview on a customer portal, but cannot access the original media content.

17 Claims, 5 Drawing Sheets

(56) References Cited

U.S. PATENT DOCUMENTS

| | | | |
|---|---|---|---|
| 2006/0002551 A1* | 1/2006 | Brown | H04N 21/235 380/217 |
| 2008/0037420 A1* | 2/2008 | Tang | H04L 1/1607 370/229 |
| 2009/0013351 A1* | 1/2009 | Liao | H04N 21/84 725/39 |
| 2009/0100459 A1* | 4/2009 | Riedl | H04N 21/26225 725/35 |
| 2009/0150943 A1* | 6/2009 | Vasudevan | H04L 12/1886 725/86 |
| 2009/0193469 A1* | 7/2009 | Igarashi | H04N 21/64322 725/56 |
| 2010/0086020 A1* | 4/2010 | Schlack | H04N 21/2402 375/240.01 |
| 2010/0115627 A1* | 5/2010 | Chow | H04N 21/8355 726/28 |
| 2010/0121936 A1* | 5/2010 | Liu | H04L 65/4084 709/217 |
| 2011/0138431 A1* | 6/2011 | Cedervall | H04L 65/4076 725/109 |
| 2011/0188439 A1* | 8/2011 | Mao | H04L 67/303 370/312 |
| 2011/0197239 A1* | 8/2011 | Schlack | H04N 21/2393 725/95 |
| 2011/0255555 A1* | 10/2011 | Alexander | H04N 21/23805 370/468 |
| 2011/0302313 A1* | 12/2011 | Diab | H04L 12/66 709/227 |
| 2012/0195362 A1* | 8/2012 | Benno | H04N 21/8456 375/240.01 |
| 2012/0331513 A1* | 12/2012 | Yamagishi | H04N 21/8545 725/95 |
| 2013/0024901 A1* | 1/2013 | Sharif-Ahmadi | H04N 21/4263 725/114 |
| 2013/0091521 A1* | 4/2013 | Phillips | H04N 21/23424 725/35 |
| 2013/0132986 A1* | 5/2013 | Mack | H04N 21/2662 725/14 |
| 2014/0074988 A1* | 3/2014 | Parekh | H04N 21/23424 709/219 |
| 2014/0150046 A1* | 5/2014 | Epstein | H04N 21/643 725/126 |
| 2014/0189754 A1* | 7/2014 | Major | H04N 21/64738 725/67 |
| 2014/0201796 A1* | 7/2014 | Moon | H04N 21/4345 725/110 |
| 2014/0230003 A1* | 8/2014 | Ma | H04N 21/8455 725/115 |
| 2014/0282766 A1* | 9/2014 | Good | H04N 21/2343 725/93 |
| 2014/0282777 A1* | 9/2014 | Gonder | H04N 21/64322 725/109 |
| 2015/0043379 A1* | 2/2015 | Shimokuni | H04L 45/586 370/254 |
| 2015/0052570 A1* | 2/2015 | Lee | H04N 21/435 725/110 |
| 2015/0263916 A1* | 9/2015 | Phillips | H04L 65/80 709/224 |
| 2015/0358662 A1* | 12/2015 | Drouin | H04N 21/2662 725/97 |
| 2018/0145988 A1* | 5/2018 | Carson | H04L 63/068 |
| 2019/0313161 A1* | 10/2019 | Wilms | H04N 19/114 |

* cited by examiner

SYSTEMS AND METHODS FOR SECURELY PROVIDING PREVIEW SAMPLES OF MEDIA CONTENT DISTRIBUTED TO IN-FLIGHT ENTERTAINMENT SYSTEMS

BACKGROUND

The field of the invention generally relates to distributing early window video content to in-flight entertainment systems, and more particularly, to systems and methods for generating preview samples of a video file scheduled for ordered for distribution to in-flight entertainment systems and allowing the preview samples to be reviewed by a customer.

In-flight entertainment systems, commonly referred to as IFEs, are entertainment systems installed on passenger aircraft to present video and audio content to the passenger while on the aircraft, including during flight. Typically, IFEs comprise an onboard entertainment management system including a media content server, and a plurality of display systems. The display systems may include in-seat display systems installed at each seat, and/or shared video displays installed at spaced locations throughout the cabin of the vehicle in which each video display is visible from different segments of passenger seats on the aircraft.

The IFEs having individualized in-seat display systems typically allow each passenger to select from multiple video channels and/or audio channels, or even individually select and play videos, including movies, from a library of videos. Indeed, some in-seat display systems include smart monitors having the capability to provide computer applications and process and store data internally. The IFEs may also provide access to games, communication applications (e.g., telephone service, messaging, etc.), internet browsing, and other computer applications. More recently, some IFEs are configured to allow passengers to stream media content available on the IFEs directly to each passenger's own personal electronic devices, such as a tablet computer, personal computer, smartphone or the like. In such IFEs, a passenger connects to a WiFi access point of the IFE and then uses a web browser or a customized application ("app") to view available media content, select media content, and then view and/or listen to the media content.

The media content presented on IFEs is licensed by the carrier for use on the IFEs. For instance, airlines license movies which are then made available for viewing on the IFEs. Generally, the digital video files for each movie are loaded onto the media content server of each IFE, and then the IFE allows passengers to play the media content on an in-seat display or personal electronic device.

In the competitive market of commercial airlines, many airlines are licensing what are referred to as "early window" releases of movies. Early window content, also referred to herein as early window movies, are copies of movies made available shortly after, or even sometimes at the same time as, the release of the movies in theatres (i.e., theatrical release), and prior to widespread consumer distribution. Thus, airlines are able to offer their customers access to new movies before they are made widely available, which is an attractive feature for airline passengers. The release of movies for display outside of the theatres, such as for display on consumer devices like DVD players and for streaming via streaming services like NETFLIX®, are typically delayed for a period after theatrical release. The delay is necessary because theatre owners are reluctant to screen movies without the delay as early consumer release significantly reduces theatre attendance and associated theatre revenues. Furthermore, unauthorized copying and distribution of early release movies harms movie studio revenue, including theatre revenue and subsequent distribution channels such as download to own, digital rental, DVD sales, kiosk rentals, streaming subscriptions and advertiser sponsored cable and broadcast television.

Accordingly, access to early window content typically requires greater security measures than to prevent unauthorized copying and distribution. Movie studios place heightened security measures on customers of early window movies, and greater restrictions on access to the movie content. However, this results in some difficulties encountered by the entities distributing the early window content to the IFEs. For example, such entities cannot allow the airlines to view the movies prior to movies being downloaded onto the IFE systems of the airlines. This restrictive measure is prevents necessary to prevent unauthorized copying of the movie content. However, this also prevents the airline (the customer) from confirm that the content to be delivered by the distributor is the correct content they have ordered.

Accordingly, there is a need for a secure system and method to allow a content licensing customer to preview media content they have ordered without compromising the security of the video content.

SUMMARY

In one embodiment, the present invention is directed to an innovative system for providing preview samples of media content, such as early window movies, and which is secure in that it does not allow unauthorized copying of the media content which would compromise the value of the media content. The system includes a media receiving server. The media receiving server is a server configured to receive secure media content, such as early window movies, from a movie provider, such as a movie studio or movie processing lab. The media receiving server includes a computing system having a processor, a storage device, a network adapter and a media sampling software application. The media receiving server receives a video file from the movie provider via a communication network, such as a secure connection to the internet. The media receiving server stores the video file on the storage device. The video file may be encrypted or not encrypted.

The media sampling software application is configured to program the computing system to perform a process to generate a preview sample of the video file. The computing system accesses a video file for a video title from the storage device. The computing system then generates a video sample including a series of still digital images from the video file. Each still digital image is separated by a first time interval in the video file from the other still digital images in the series of still digital images. Thus, each of the still digital images includes an image from a non-consecutive frame of the video (e.g., a movie).

The computing system then generates an audio sample including a series of audio clips from the video file. Each audio clip is separated by a second time interval in the video file from the other audio clips in the series of audio clips. Thus, each of the audio clips is a non-consecutive segment of audio from the video. A video file may have multiple audio tracks, such as for different languages in which the video file may be played. In another aspect of the system, the computing system generates an audio sample for each audio track, i.e., for each audio language track.

Then, the computing system associates the video sample and the audio sample with the video file and video title. The association of the video sample and audio sample with the video file and video title allows a user to play the preview sample by selecting the video title. Playing the preview sample may include sequentially displaying each of the still digital images of the video sample, and/or sequentially playing the audio clips of the audio sample, and/or sequentially playing the audio clips of the audio sample for each language track.

In another aspect of the system, the media receiving server may be secured in a facility certified as a Motion Picture Association of America secure facility for early window movies. This allows the system to be used for receiving and processing early window movie content.

In another aspect, the system may further comprise a web server configured to provide a customer portal accessible by a user (e.g., a customer) via the internet. The web server includes a media management software application which provides the customer portal. The customer portal may include one or more functionalities, such as providing a video title review page which includes a list of the video content ordered by the user. The video title review page may include video title information for each video title, such as a title name, included languages, running time, etc. The video title review page is configured to allow the user to select a video title from the list and obtain a preview. In response to receiving the selection of one of the video titles, the customer portal provides a preview of the video title. The preview includes sequentially displaying each of the still digital images of the video sample, and sequentially playing the audio clips of the audio sample. While the customer portal allows a customer to view the preview, the customer cannot access the original In another aspect, the media receiving server is in communication with a video provider server via a communication network for downloading the video file from the video provider server. As some examples, the media receiving server may download the video file from a movie studio or movie lab.

In another aspect, the first time interval is determined by dividing a full running time of the video file by a number of still digital images included in the video sample. For instance, it may be desired to have a total of from 100 to 500 still digital images in the video sample. If the video file has a running time of 100 minutes, and it is desired to have 100 digital still images, then the first time interval is 100 minutes divided by 100 images, which equals a first time interval of 1 minute. The first time interval does not have to be constant throughout the video file, but may vary. For example, the first time interval may be longer at the beginning and end of the video file (e.g., because these portions include credits or other filler) and shorter within the middle of the video file which includes video which may better represents the movie. Alternatively, a number of still digital images included in the video sample may be determined by dividing a full running time of the video file by a predetermined first time interval between each still digital image.

In another aspect of the system, the second time interval is determined by dividing a full running time of the video file by a number of audio clips to be included in the audio. For example, it may be desired to have a total of from 10-50 audio clips in the audio sample. If the video file has a running time of 100 minutes, and it is desired to have 10 audio clips, then the second time interval is 100 minutes divided by 10 audio clips, which equals a second time interval of 10 minutes. The second time interval does not have to be constant throughout the video file, but may vary. Alternatively, a number of audio clips included in the audio sample may be determined by dividing a full running time of the video file by a predetermined second time interval between each audio clip. The length of each audio clip is designed to be long enough that there is a high probability that the audio will indicate the language of the audio in the video file, while being short enough to avoid compromising the security of the video file. For example, each audio clip in an audio sample may be from 5 to 10 seconds long.

In still another aspect of the system, the media receiving server is also configured to place a watermark on the still digital images having information which can be used to identify a customer having access to the video sample via the customer portal.

Accordingly, the system generates a preview of a video file which can be presented to a user to confirm that the video file is for the media content the user ordered, without any risk of compromising the security of the video file. The preview includes only a small fragment of the video file, which even if copied and distributed without authorization does not diminish the value of the original media content.

Another embodiment of the present invention is directed to a method for providing preview samples of media content, such as early window movies, and which is secure in that it does not allow unauthorized copying of the media content which would compromise the value of the media content. The method may be performed by the system described herein, or a similar system. The method includes accessing a video file for a video title. A video sample is generated including a series of still digital images from the video file. Each still digital image is separated by a first time interval in the video file from the other still digital images in the series of still digital images. Hence, each of the still digital images includes an image from a non-consecutive frame of the video (e.g., a movie). An audio sample is also generated from the video file. The audio sample includes a series of audio clips from the video file wherein each audio clip is separated by a second time interval in the video file from the other audio clips in the series of audio clips. Accordingly, each of the audio clips is a non-consecutive segment of audio from the video. As explained herein, a video file may have multiple audio tracks, such as for different languages in which the video file may be played. In another aspect of the method, an audio sample for each audio track, i.e., for each audio language track is generated. Then, the video sample and the audio sample are associated with the video file and video title.

In another aspect, the method may also include providing a customer portal accessible by a user via the internet. The customer portal provides a preview of the video title to a user via the customer portal by sequentially displaying each of the still digital images of the video sample and sequentially playing the audio clips of the audio sample.

In still another aspect, the method may include providing a customer portal accessible by a user via the internet. The customer portal includes a video title review page which includes a list of a plurality of video titles ordered by a user including the video title. The video title review page is configured to allow the user to select a video title from the list and obtain a preview. The method includes receiving a selection of the video title from the video title review page from a user via the customer portal. In response to receiving a selection of the video title, preview of the video title is provided to a user via the customer portal. The preview includes sequentially displaying each of the still digital images of the video sample and sequentially playing the audio clips of the audio sample.

In another aspect of the method, the first time interval is determined by dividing a full running time of the video file by a number of still digital images included in the video sample. For instance, it may be desired to have a total of from 100 to 500 still digital images in the video sample. If the video file has a running time of 100 minutes, and it is desired to have 100 digital still images, then the first time interval is 100 minutes divided by 100 images, which equals a first time interval of 1 minute. The first time interval does not have to be constant throughout the video file, but may vary. For example, the first time interval may be longer at the beginning and end of the video file (e.g., because these portions include credits or other filler) and shorter within the middle of the video file which includes video which may better represents the movie. Alternatively, a number of still digital images included in the video sample may be determined by dividing a full running time of the video file by a predetermined first time interval between each still digital image.

In yet another aspect of the method, the second time interval is determined by dividing a full running time of the video file by a number of audio clips to be included in the audio. For example, it may be desired to have a total of from 10-50 audio clips in the audio sample. If the video file has a running time of 100 minutes, and it is desired to have 10 audio clips, then the second time interval is 100 minutes divided by 10 audio clips, which equals a second time interval of 10 minutes. The second time interval does not have to be constant throughout the video file, but may vary. Alternatively, a number of audio clips included in the audio sample may be determined by dividing a full running time of the video file by a predetermined second time interval between each audio clip. The length of each audio clip is designed to be long enough that there is a high probability that the audio will indicate the language of the audio in the video file, while being short enough to avoid compromising the security of the video file. For example, each audio clip in an audio sample may be from 5 to 10 seconds long.

In still another aspect, the method includes placing a watermark on the still digital images having information which can be used to identify a customer having access to the video sample via the customer portal.

Accordingly, the method generates a preview of a video file which can be presented to a user to confirm that the video file is for the media content the user ordered, without any risk of compromising the security of the video file. Like the system, the preview includes only a small fragment of the video file, which even if copied and distributed without authorization does not diminish the value of the original media content.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant, wherein:

FIG. 3 shows an exemplary video title review page for a customer portal, according to one embodiment of the present invention;

DETAILED DESCRIPTION

The present invention is directed to systems and methods for providing preview samples of media content, especially secure protected media content such as early window movies, and which is secure in that it does not allow unauthorized copying of the media content which would compromise the value of the media content. The systems and method disclosed herein generate video samples and audio sample which may be presented to a user for various purposes, such as to allow a customer to confirm that a media file is for the media content that the customer ordered.

The systems and methods of the present invention will be described in the context of the distribution of early window movies for presentation on IFEs on aircraft. However, the invention is not necessarily limited to such application, and may be utilized for providing preview sample of any suitable media content.

Figure 1:
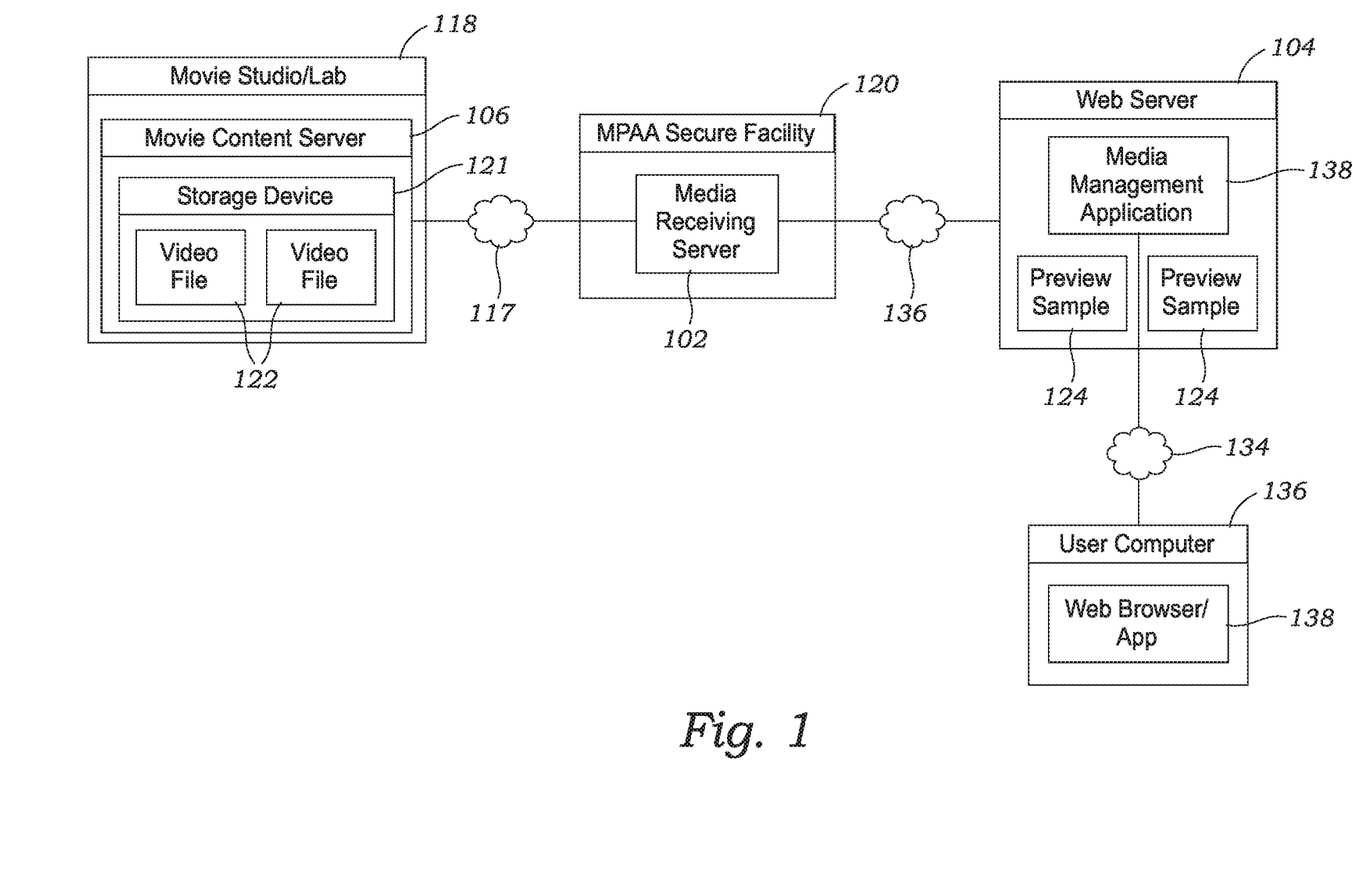
FIG. 1 illustrates a block schematic diagram of a system for providing preview samples of media content, according to one embodiment of the present invention.
Figure 2:
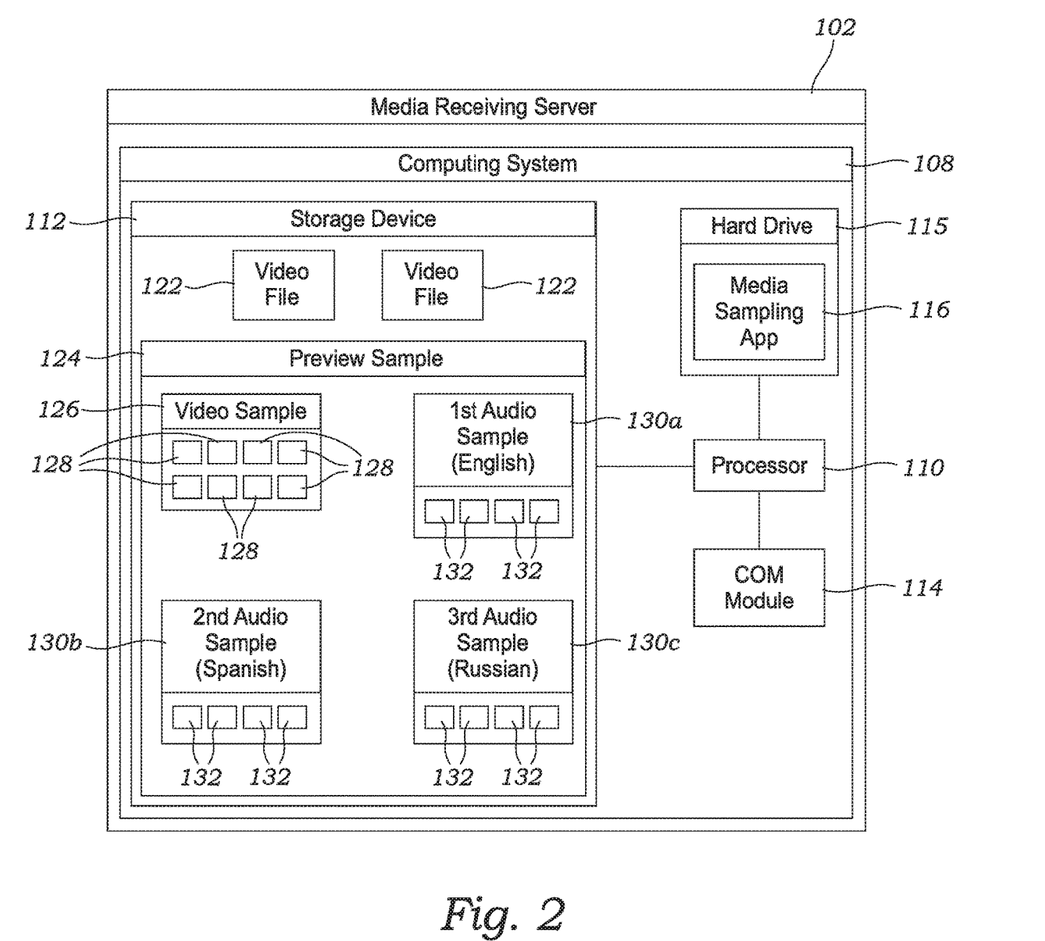
FIG. 2 illustrates a block schematic diagram of the media receiving server of the system of FIG. 1, according to one embodiment of the present invention.

Referring to FIGS. 1 and 2, a system 100 for providing previous samples of early window movies is illustrated. The system 100 includes a media receiving server 102, a web server 104, and a movie content server 106. As shown in the more detailed view of FIG. 2, the media receiving server 102 includes a computer system 108 having one or more processors 110, a storage device 112, a networking communication module 114 (e.g., a network adapter, or other suitable communication module), a hard drive 115, and a media sampling software application 116 stored on the hard drive 115. The media receiving server 102 is in network communication with the movie content server 106 of a movie studio or movie processing lab 118 via the networking communication module 114 and a communication network 117.

The communication network 117 may be any suitable communication network, such as a proprietary network, LAN, WAN, cellular network, wireless network, the internet, and/or other communication network, or any combination thereof.

The media receiving server is secured in a secure facility 120. The secure facility 120 is certified as a secure facility for receiving, storing and distributing secure media content, such as early window movies. As one example, the secure facility 120 may be certified by the Motion Picture Association of America as a secure facility for early window movies. This allows the system 100 to be used for receiving and processing early window movie content.

The movie content server 106 has a storage device 121 stores video files 122 for movies, including early window movies 122, and provides secure access to the video files 122 for download by authorized and authenticated computing systems via the communication network 117. The movie content server 106 may be provided by a movie studio, or a movie processing lab 118. The movie processing lab 118 (or movie studio) processes video files 122 into various formats, such as formats for use on IFEs. For example, a video file 122 may be originally in a digital format for use on theatre digital projection systems. The movie processing lab reformats the theatre digital file into other formats such as an mpeg video file, or other suitable format. The lab 118 may also modify the resolution, running time, aspect ratio, audio languages, and/or other characteristics of the video playback.

The media receiving server 102 is configured to securely access and download video files 122 for video titles (e.g., movies) from the movie content server 106 via the communication network 117. The movie content server 106 may utilize security features to verify the media receiving server 102 is authorized to access and download the video files 122. For example, the movie content server 106 may use multifactor authentication, secure communication protocols, and/or other suitable means of secure communication.

The media receiving server 102 may receive video files 122 via MPAA approved, Encrypted, Transport Layer Security (TSL) protective private network. Video files 122 may be ordered by respective customers of the operators of the media receiving server 102. For instance, the media receiving server 102 may be operated by a manufacturer/provider of IFEs, or a vendor of media content for IFEs. The customers may be airlines having IFEs installed on their aircraft. When the operator receives an order for a particular movie from a customer, the media receiving server 102 securely accesses the video file 122 for the movie from the movie content server 106 and securely downloads the video file 122 via the communication network 117. The media receiving server 102 stores the downloaded video file 122 on the storage device 112. The video file 122 may be encrypted or not encrypted.

Referring to FIG. 2, the media sampling software application 116 is configured to program the computing system 108 to perform a process to generate a preview sample 124 of the video file 122 stored on the storage device 112. The computing system 108 accesses the video file 122 for the video title from the storage device 112.

The computing system 108 generates a video sample 126 including a series of still digital images 128 from the video file 122. The media sampling software application 116 may include a sub-routine or program for sampling the video file 122 to generate the series of still digital images 128. For example, there are various open source software programs for creating a digital still image from a video file 122. The media sampling software application 116 is further configured to generate the series of still digital images 128 wherein each still digital image is separated by a first time interval in the video file 122 from the other still digital images 128 in the series of still digital images 128. In this way, each of the still digital images 128 is an image from a non-consecutive frame of the video file 122.

The number of still digital images 128 and the first time interval may be determined in various ways. In a first method, the first time interval is determined based on a desired number of still digital images 128 to be included in the video sample 126. A primary purpose of providing a customer with a preview sample of the video file 122 is to allow the customer to confirm that the video file 122 is for the movie the customer ordered. Hence, the number of still digital images 128 should be sufficient to allow a customer to identify the movie from viewing the still digital images 128. Another purpose may be to confirm the integrity of the video file 122 for the movie, so the video sample 126 may include images from throughout the running time of the video file 122. As an example, it may be desired to have a total of from 100 to 500 still digital images 128 in the video sample 126. In this case, a first time interval may be determined by dividing a full running time of the video file 122 by a number of still digital images included in the video sample. This assumes a constant first time interval. As one specific example, if the video file has a running time of 100 minutes, and it is desired to have 100 digital still images, then the first time interval is 100 minutes divided by 100 images 128, which equals a first time interval of 1 minute. The first time interval does not have to be constant throughout the video file, but may vary. For example, the first time interval may be longer at the beginning and end of the video file 122 (e.g., because these portions include credits or other filler) and shorter within the middle of the video file 122 which includes video which may better represent the movie.

In another way, the number of still digital images 128 included in the video sample 126 may be determined by dividing a full running time of the video file by a predetermined first time interval between each still digital image 128. There are still other ways for determining the number of still digital images 128 and/or the first time interval between each still digital image 128, which can be discerned by one of skill in the art with the guidance provided herein.

The media sampling software application 116 may utilize some video sampling variables which are input by a user, such as setting the number of still digital images 128 in the video sample 126, the first time interval, etc., which variables may be set for different portions of the video file 122 (such as the beginning portion, middle portion, and end portion). Once such variables are set by a user, the media sampling software application 116 may automatically generate the video sample 126 comprising the digital still images 128 from the video file 122, without human intervention.

The digital still images 128 in the video sample 126 can be generated and/or formatted in various ways. In one way each digital still image 128 may be generated and/or stored as a separate image file, such as a jpeg, bitmap, or other image file format. In another way, the digital still images 128 can be combined into a single image having a single image file (again, such as a jpeg, bitmap, or other suitable image file format), arranged in a concatenated array or collage of the digital still images 128. Then, when the video preview is played back, each of the digital still images 128 in the single image file is displayed. This may be done by storing the coordinates of each digital still image 128 and then sequentially displaying the image 128 at each stored coordinates. One advantage of using a single image file with the digital still images 128 arrayed is that it can use less storage space than individual image files for each digital still image 128.

The media sampling software application 116 may also insert a watermark on one or more of the still digital images 128. The watermark includes information which can be used to identify a customer having access to the video sample 126 via the customer portal.

The computing system 108 also generates one or more audio samples 130, each including a series of audio clips 132, from the video file 122. The media sampling software application 116 may include a sub-routine or program for sampling the video file 122 to generate the audio clips 132 for the audio samples 130. For example, there are various open source software programs for creating audio clips 132 from a video file 122.

Each audio clip 132 is separated by a second time interval in the video file 122 from the other audio clips 132 in the series of audio clips 132. As a result, each of the audio clips 132 is a non-consecutive segment of audio from the video file 122. In many cases, video files 122 for movies have multiple audio tracks, such as for different languages in which the video file 122 may be played. Accordingly, the media sampling software application 116 is configured to generate an audio sample 130 for each audio track, such as for each language. As depicted in FIG. 2, the preview sample 124 is for a video file 122 having three different audio tracks, an English audio track, a Spanish audio track, and a Russian audio track. In this example, the media sampling software application 116 generates an audio sample 130 for each audio track, which includes a first audio sample 130a for the English audio track, a second audio sample 130b for the Spanish audio track, and a third audio sample 130c for the Russian audio track. Of course, the video file 122 can have fewer or more audio tracks, and the computing system 108 can generate an audio sample 130 for any one or more of the audio tracks.

Similar to the still digital images 128, there are various ways to determine the number of audio clips 132 in each audio sample 132, the second time interval, and/or the length of each audio clip 132. In one way, the second time interval is determined based on a desired number of audio clips 132 to be included in each audio sample 130. Again, a main purpose of providing a customer with a preview sample 124 of the video file 122 is to allow the customer to confirm that the video file 122 is for the movie the customer ordered. With respect to audio, the preview sample 124 allows the customer to confirm that the audio tracks, for example the languages, ordered for the video title are included in the video file 122. Hence, the number of audio clips 132, and length of each audio clip 132 needs to be sufficient to allow a customer to confirm each audio track from listening to the audio sample(s) 130. The audio sample(s) 130 can also allow the customer to confirm the integrity of each audio track in the video file 122, so the audio sample(s) 130 preferably include audio clips 132 from throughout the running time of the video file 122. As an example, it may be desired to have a total of from 10 to 50 audio clips 132 in each audio sample 130. In this case, a first time interval may be determined by dividing a full running time of the video file 122 by a number of audio clips 132 included in each audio sample 130. This may assumes a constant second time interval. The length of each audio clip 132 may be from 5 to 10 seconds long, as this allows a user to hear enough dialogue to recognize the language in the audio clip 132. As an example, if the video file 122 has a running time of 100 minutes, and it is desired to have 10 audio clips 132 in an audio sample 130, then the second time interval is 100 minutes divided by 10 audio clips 132, which equals a second time interval of 10 minutes. The second time interval does not have to be constant throughout the video file 122, but may vary. For example, the second time interval may be longer at the beginning and end of the video file 122 (e.g., because these portions include credits or other filler) and shorter within the middle of the video file 122 which includes video which may have audio that is easier to use to determine whether the audio track is correct, such as the language of the audio track.

In another way, the number of audio clips 132 included in each audio sample 130 may be determined by dividing a full running time of the video file 122 by a predetermined second time interval between each audio clip 130. With the guidance provided herein, those of skill in the art can determine other suitable ways to determine the number of audio clips 132 to be used in each audio sample 130, and/or the second time interval between each audio clip 132.

The media sampling software application 116 is further configured to associate the video sample 126 and the audio sample(s) 130 with the video file 122 having a video title. For example, the video sample 126 and audio sample(s) 130 may be given an identifier which matches the video file 122, or other manner of association so that a user can play the preview sample 124, including the video sample 126 and audio sample(s) by selecting the video title from a list of video titles ordered by the user, as described herein. As described herein, playing the preview sample 124 typically includes sequentially displaying each of the still digital images 128 of the video sample 126, and/or sequentially playing the audio clips 132 of each of the audio sample(s) 132.

The web server 104 is configured to provide a customer portal accessible by a user computer 136 (e.g., a customer) via a communication network 134. The customer portal may be accessed using a web browser or app 138 running on the user computer 136. The customer portal may be secured such that it is only accessible using authorized customer account credentials. Access to the customer portal may also require multi-factor authentication, such as two-factor authentication. The communication network 134 is typically the internet, but may be any suitable communication network, such as a proprietary network, LAN, WAN, cellular network, wireless network, the internet, and/or other communication network, or any combination thereof. The web server 104 is in network communication with the media receiving server 102 via a communication network 136 so that the web server 104 can access and download the preview samples 124 for video files 122 from the media receiving server 102 and store them on the web server 104. The communication network 136 may be any suitable communication network, such as a proprietary network, LAN, WAN, cellular network, wireless network, the internet, and/ or other communication network, or any combination thereof.

The web server 104 includes a media management software application 138 which provides the customer portal for enabling customers to review and manage the media content for the customers' respective IFE systems. For example, the customer portal enables a customer to review the movies it has ordered from its IFE provider and/or media content vendor. FIG. 3 illustrates an example of a video title QC (quality control) page 202 of an exemplary graphical user interface 200 for the customer portal. The graphical user interface 200 includes numerous different media management pages, menus, menu trees, and other functions for a customer to select in order to review and manage the media content ordered and/or in the available library of the customer.

Figure 4:
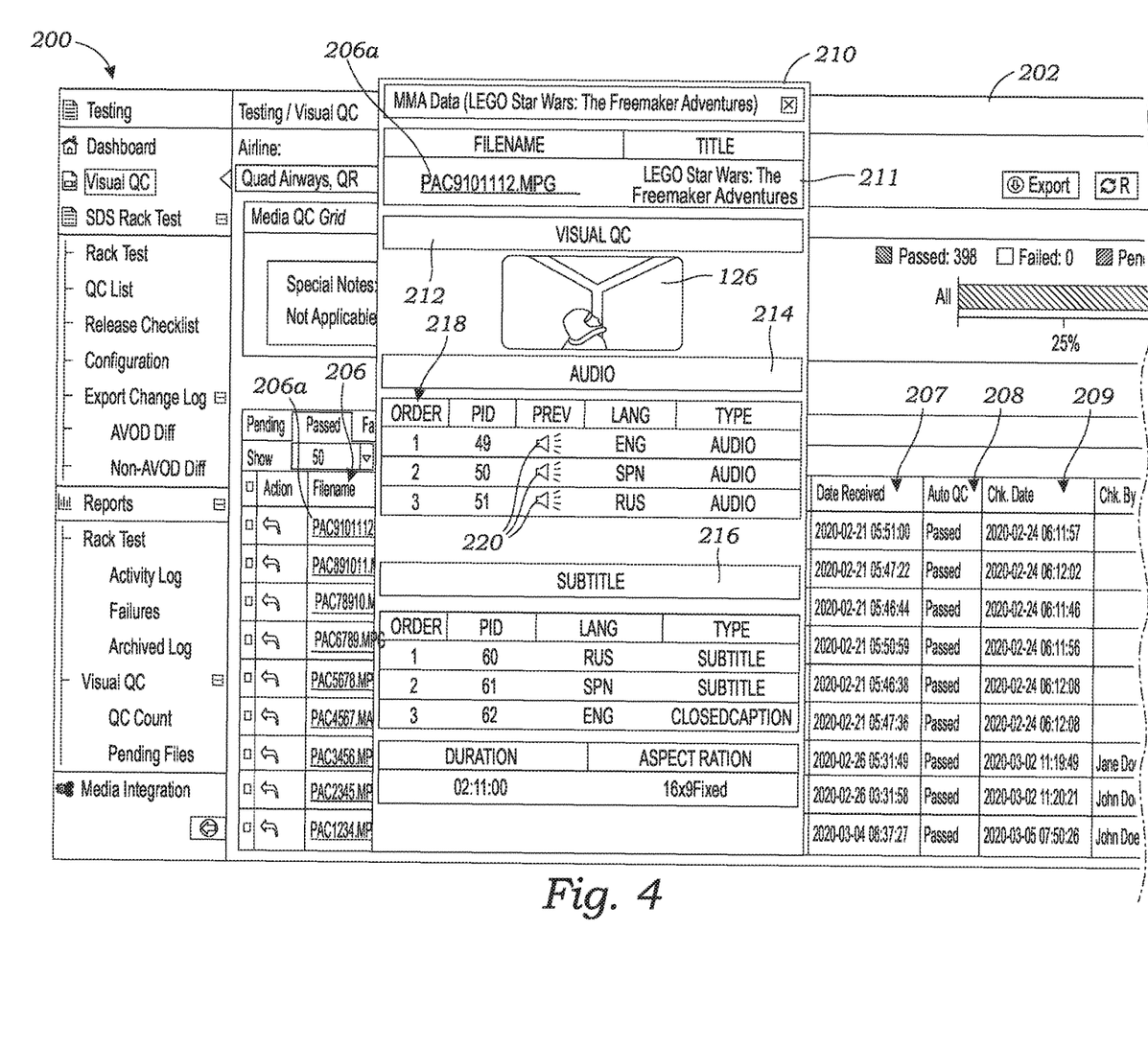
FIG. 4 shows the video title review page of FIG. 3 with one of the video titles selected and a preview window displayed over the title review page, according to one embodiment of the present invention.
Figure 5:
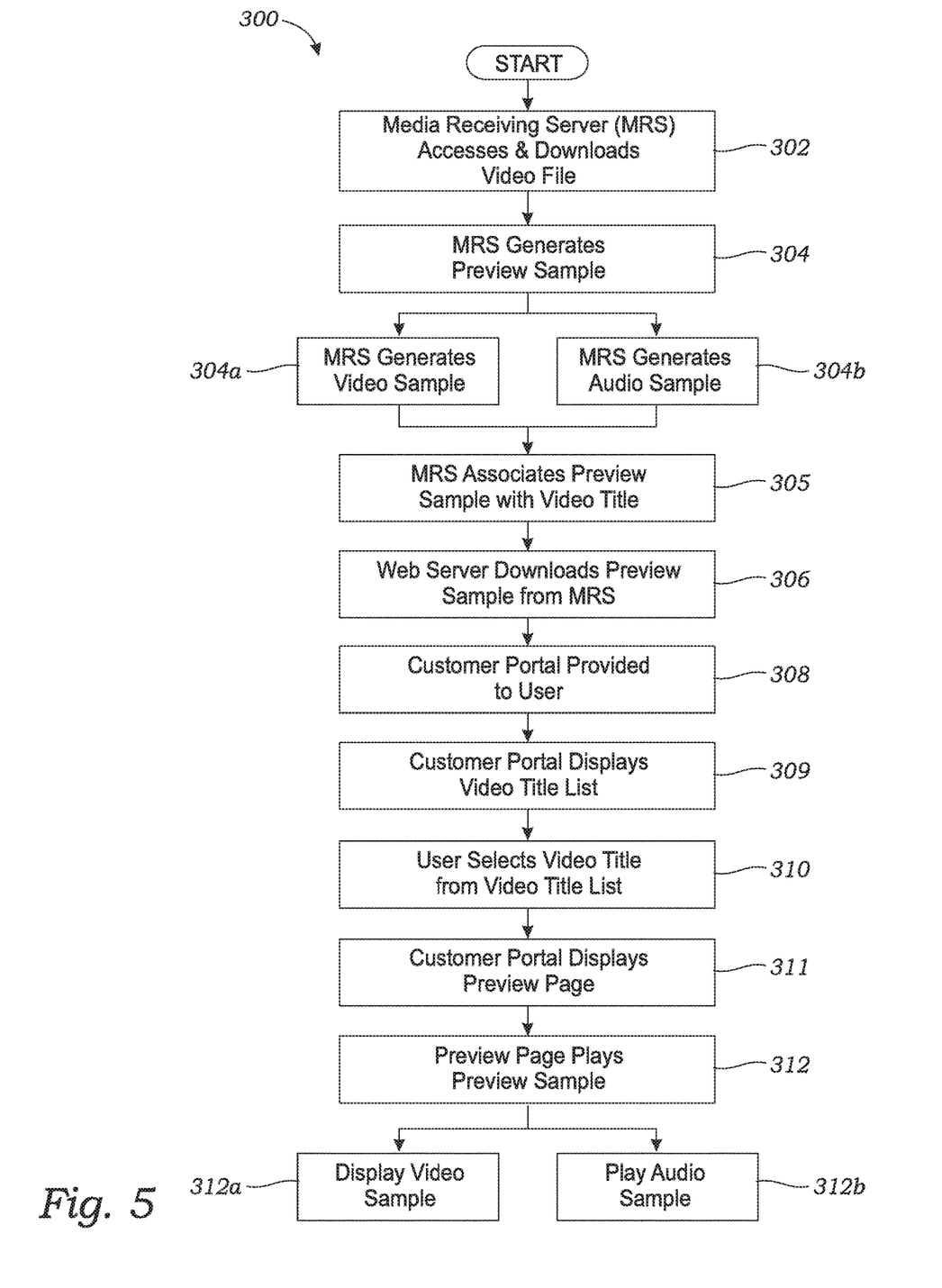
FIG. 5 illustrates a flow chart of one embodiment of a method for providing preview samples of media content using the system of FIGS. 1 and 2, according to one embodiment of the present invention.

The video title QC page 202 includes a list 204 of the video titles 205 ordered by the customer and/or in the video library for the respective customer. The list 204 includes a filename 206 for the video file 122 for each video title 205, a date received 207, an "Auto QC" result 208, the date the file was checked 209, as well as other information. Each of the video titles 205 is selectable by a user by clicking on the filename 206 for the desired video title 205 to review. As shown in FIG. 4, upon selecting the filename 206a for a video title 205 on the video title QC page 202, the customer portal displays a preview page 210 for the selected video title. The preview page 210 includes, for the selected video title, the filename 206, the full movie title 211, a video sample window 212, an audio sample window 214 and a subtitle window 216. The video sample window 212 and audio sample window 214 are configured to play the preview sample 124 on the user computer 136. The video sample 126 for the selected video title is displayed in the video sample window 212 by sequentially displaying each of the still digital images 128 of the video sample 126. The video sample 126 may be displayed automatically when the preview page 210 is opened upon the user selecting the video title, or the preview page 210 may include user selectable commands to start, stop, pause, etc., the sequential display of the still digital images 128. For instance, the video sample window 212 may be selectable to alternately start and stop the display of the video sample 126.

The audio sample window 214 includes an audio list 218 of each of the audio tracks 220 for the selected video title. Each of the audio tracks in the audio list 218 includes a user selectable command 220 for playing the respective audio sample 130 for the respective audio track. When the user selects the selectable command 220 for an audio tracks, the audio sample window 214 plays the audio sample 130 by sequentially playing the audio clips 132 of the audio sample 130 for the selected audio track. A user can successively select each of the play commands 220 for the audio tracks to listen to each of the audio samples 130a, 130b and 130c.

Turning to FIG. 4, a flow chart of a method 300 for providing preview samples of media content using the system of FIGS. 1 and 2 is illustrated. The method 300 includes a step 302 in which the media receiving server 102 accesses and downloads a video file 122 for a video title from the movie studio/lab 118 via the communication network 117. At step 304, the media receiving server 102 generates a preview sample 124 of the video file 122, including a video sample 126 and an audio sample 130 for each audio track in the video file 122. At step 304a, the media receiving server 102 generates the video sample 126 including a series of still digital images 128 from the video file 122. Each still digital image 128 is separated by a first time interval in the video file 122 from the other still digital images in the series of still digital images such that each of the still digital images includes an image from a non-consecutive frame of the video.

At step 304b, the media receiving server 102 generates an audio sample 130 for each audio track in the video file 122. Each audio sample 130 includes a series of audio clips 132 from the video file 122 wherein each audio clip 132 is separated by a second time interval in the video file 122 from the other audio clips 132 in the series of audio clips 132, such that each of the audio clips 132 is a non-consecutive segment of audio from the video.

At step 305, the media receiving server 102 associates the preview sample 124 with the video title.

At step 306, the web server 104 downloads the preview sample 124 from the media receiving server 102 via the communication network 136, and stores the preview sample 124 on the web server 104. At step 306, the web server 104 provides a customer portal to a web browser or app 138 on a user computer 136. At step 309, the customer portal displays a video title QC page 202 including a list 204 of the customer's video titles 205. At step 310, the user selects one of the video titles 205 from the list 204 and the customer portal receives the selection. In response to the selection, at step 311, the customer portal displays a preview page 210. The preview page 210 includes, for the selected video title 205, the filename 206, the full movie title 208, and a video sample window 212, an audio sample window 214 and a subtitle window 216. At step 312, the video sample window 212 and audio sample window 214 play the preview sample 124 on the user computer 136. At step 312a, the video sample 126 for the selected video title 205 is displayed in the video sample window 212 by sequentially displaying each of the still digital images 128 of the video sample 126. At step 312b, a selected audio sample 130 is played in response to receiving a selection of one of the audio tracks by sequentially playing the audio clips 132 of the audio sample 130 for the selected audio track.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components. Accordingly, embodiments are intended to exemplify alternatives, modifications, and equivalents that may fall within the scope of the claims. The invention, therefore, should not be limited, except to the following claims, and their equivalents.

What is claimed is:

1. A system for providing preview samples of media content, comprising:
   a media receiving server including a computing system having a processor, a storage device, a network adapter and a media sampling software application;
   the media sampling software application configured to program the computing system to perform the following process:
   access a video file for a video title;
   generate a video sample including a series of still digital images from the video file, each still digital image separated by a first time interval in the video file from the other still digital images in the series of still digital images;
   generate an audio sample including a series of audio clips from the video file, each audio clip separated by a second time interval in the video file from the other audio clips in the series of audio clips; and
   associate the video sample and the audio sample with the video file and video title;
   wherein the first time interval is determined by dividing a full running time of the video file by a number of still digital images included in the video sample.

2. The system of claim 1, wherein the number of still digital images included in the video sample is from 100 to 500 still digital images.

3. The system of claim 1, wherein the still digital images include a watermark having information which can be used to identify a customer having access to the video sample via a customer portal.

4. The system of claim 1, further comprising:
   a web server including a computer server, the web server having a media management application configured to provide a customer portal accessible by users via the internet, the customer portal configured to avow the user to preview the video title ordered by a respective customer by sequentially displaying each of the still digital images of the video sample and sequentially playing the audio clips of the audio sample; and
   wherein the media receiving server is in communication with the web server via a communication network for transferring the video sample and audio sample to the web server.

5. The system of claim 1, wherein the media receiving server is in communication with a video provider server via a communication network for downloading the video the from the video provider server.

6. A system for providing preview samples of media content, comprising:
- a media receiving server including a computing system having a processor, a storage device, a network adapter and a media sampling software application;
- the media sampling software application configured to program the computing system to perform the following process:
  - access a video file for a video title;
  - generate a video sample including a series of still digital images from the video file, each still digital image separated by a first time interval in the video file from the other still digital images in the series of still digital images;
  - generate an audio sample including a series of audio clips from the video file, each audio clip separated by a second time interval in the video file from the other audio clips in the series of audio clips; and
  - associate the video sample and the audio sample with the video file and video title;
- wherein the second time interval is determined by dividing a full running time of the video file by a number of audio clips to be included in the audio.

7. The system of claim 6, wherein the number of audio clips included in the video sample is from 10 to 50 clips, each having a duration of from 5 to 10 seconds.

8. The system of claim 6, further comprising:
- a web server including a computer server, the web server having a media management application configured to provide a customer portal accessible by users via the internet, the customer portal configured to allow the user to preview the video title ordered by a respective customer by sequentially displaying each of the still digital images of the video sample and sequentially playing the audio clips of the audio sample; and
- wherein the media receiving server is in communication with the web server via a communication network for transferring the video sample and audio sample to the web server.

9. The system of claim 6, wherein the media receiving server is in communication with a video provider server via a communication network for downloading the video file from the video provider server.

10. A method for providing preview samples of media content, comprising:
- accessing a video file for a video title;
- generating a video sample including a series of still digital images from the video file, each still digital image separated by a first time interval in the video file from the other still digital images in the series of still digital images;
- generating an audio sample including a series of audio clips from the video file, each audio clip separated by a second time interval in the video file from the other audio clips in the series of audio clips; and
- associating the video sample and the audio sample with the video file and video title; wherein the first time interval is determined by dividing a full running time of the video file by a number of still digital images included in the video sample.

11. The method of claim 10, wherein the number of still digital images included in the video sample is from 100 to 500.

12. The method of claim 10, further comprising:
- providing a customer portal accessible by a user via the internet; providing a preview of the video title to a user via the customer portal, the preview including sequentially displaying each of the still digital images of the video sample and playing the audio cups of the audio sample.

13. The method of claim 10, further comprising:
- providing a customer portal accessible by a user via the internet, the customer portal including a video title review page, the video title review page including a list of a plurality of video titles ordered by a user including the video title, the video title review page configured to avow the user to select a video title from the list and obtain a preview;
- receiving a selection of the video title from the video title review page from a user via the customer portal;
- providing a preview of the selected video title to the user via the customer portal, the preview including sequentially displaying each of the still digital images of the video sample and sequentially playing the audio clips of the audio sample.

14. A method for providing preview samples of media content, comprising:
- accessing a video file for a video title;
- generating a video sample including a series of still digital images from the video file, each still digital image separated by a first time interval in the video file from the other still digital images in the series of still digital images;
- generating an audio sample including a series of audio clips from the video file, each audio clip separated by a second time interval in the video file from the other audio clips in the series of audio clips; and
- associating the video sample and the audio sample with the video file and video title; wherein the second time interval is determined by dividing a full running time of the video file by a number of audio clips to be included in the audio.

15. The method of claim 14, wherein the number of audio clips included in the audio sample is from 10-50 clips each having a duration of from 5 to 10 seconds.

16. The method of claim 14, further comprising:
- providing a customer portal accessible by a user via the internet;
- providing a preview of the video title to a user via the customer portal, the preview including sequentially displaying each of the still digital images of the video sample and playing the audio clips of the audio sample.

17. The method of claim 14, further comprising:
- providing a customer portal accessible by a user via the internet, the customer portal including a video title review page, the video title review page including a list of a plurality of video titles ordered by a user including the video title, the video title review page configured to allow the user to select a video title from the list and obtain a preview;
- receiving a selection of the video title from the video title review page from a user via the customer portal;
- providing a preview of the selected video title to the user via the customer portal, the preview including sequentially displaying each of the still digital images of the video sample and sequentially playing the audio clips of the audio sample.

* * * * *